United States Patent
White

(10) Patent No.: US 6,469,695 B1
(45) Date of Patent: Oct. 22, 2002

(54) METHOD AND APPARATUS FOR TOUCH SCREEN TOUCH AHEAD CAPABILITY

(75) Inventor: Daniel Frederick White, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/239,427

(22) Filed: Jan. 28, 1999

(51) Int. Cl.⁷ .............................................. G60R 11/06
(52) U.S. Cl. ................................... 345/173; 178/18.01
(58) Field of Search .............................. 345/172, 173, 345/716, 840; 178/18.01, 18.03

(56) References Cited

U.S. PATENT DOCUMENTS

| | | | | |
|---|---|---|---|---|
| 4,570,217 A | * | 2/1986 | Allen et al. ................ | 364/188 |
| 4,821,030 A | | 4/1989 | Batson et al. ............... | 340/712 |
| 5,083,262 A | * | 1/1992 | Haff, Jr. ...................... | 392/500 |
| 5,376,945 A | | 12/1994 | Takenaka et al. ........... | 345/115 |
| 5,402,147 A | * | 3/1995 | Chen et al. .................. | 345/115 |
| 5,412,189 A | | 5/1995 | Cragun ........................ | 235/379 |
| 5,659,299 A | * | 8/1997 | Williamson et al. ... | 340/825.57 |
| 5,717,433 A | | 2/1998 | Doba .......................... | 345/173 |
| 5,767,457 A | | 6/1998 | Gerpheide et al. ............ | 178/18 |
| 5,801,682 A | | 9/1998 | Coni et al. ................... | 345/174 |

* cited by examiner

*Primary Examiner*—Vijay Shankar
*Assistant Examiner*—Nitin Patel
(74) *Attorney, Agent, or Firm*—Priest & Goldstein, PLLC

(57) ABSTRACT

A touch screen system including a data buffer to allow an operator to enter data in a touch ahead mode without waiting for the screen to be refreshed. As an operator enters data through touches to the screen, the buffer stores data represented by the touches. As the screen refreshes to reflect entry of a data item, that data item is passed from the data buffer and processed. Feedback is provided to the operator to inform the operator that each data item has been entered. The touch ahead mode may be turned on or off depending on whether the graphic being displayed is conducive to touch ahead data entry. Alternatively, touch ahead mode may be selected through an operator-entered command.

10 Claims, 3 Drawing Sheets

METHOD AND APPARATUS FOR TOUCH SCREEN TOUCH AHEAD CAPABILITY

FIELD OF THE INVENTION

The present invention relates generally to touch screen data entry. More particularly, the invention relates to buffering entries to a touch screen data entry system, in order to minimize delays presented to an operator by limitations of the rate at which the system can accept data.

BACKGROUND OF THE INVENTION

Touch screen data entry systems are becoming increasingly popular because of their ease and versatility of operation. A system having a display screen can be programmed so that the screen displays graphic objects allowing data entry, such as menus, collections of icons, or representations of characters, numerals and the like typically entered utilizing traditional data entry hardware such as keypads or keyboards. An operator enters data into such a system by touching the screen in appropriate locations as suggested by the graphic objects. The screen recognizes the touch and the position on the screen of the touch. The system interprets the touch in accordance with its programming and registers the data indicated by the touch.

Touch screen systems of the prior art are limited in the speed at which they can receive data, as the screen must refresh after every data entry. Traditionally, touch screen systems have been widely used in the hospitality industry. In applications such as reserving tables or booking rooms, rapid data entry is typically not required. A table reservation can be made, for example, by touching a representation of a table and waiting for a reservation menu for that table to be displayed, and then making a menu selection from the reservation menu. The data entries in this example depend on display of a subsequent menu, and cannot be properly made until that menu is displayed. Therefore, the requirement that the display be refreshed, does not slow data entry.

As touch screen systems decrease in price and increase in capability, they are becoming more and more popular, and are being used in wider applications. Touch screen systems are now being widely used in retail applications, in which rapid data entry is a significant advantage. It is a simple matter to program a touch screen system to display a keyboard or keypad on the screen, and allow the operator to enter data by touching representations of keys. In such specific applications, the display does not materially change (for example, the representation of a keypad is maintained, even though different keys may be highlighted as each keypress is registered) and so there is no reason to force an operator to wait for a display to be updated in order to make the next entry. Many operators can enter data much faster than a display is able to refresh an image. When the limitations of a system force the operator to wait for a display to be refreshed, this forced wait both slows operation and frustrates the operator.

In the context of a touch screen systems more generally, however, circumstances continue to exist in which it is not desirable to allow data to be entered at a rate faster than that at which the screen can be refreshed. This is because different screen displays can call for changes in the data entry protocol. If entries are made which cause the display to change significantly, allowing data entries to be made before the changes have occurred in the display can cause incorrect data to be entered. For example, if touching an item calls up a menu offering options relating to that item, it would be at best preferable and at worst necessary to wait for the display to be changed before allowing data entry, as the accuracy of the data entry is likely to depend on the visual cues provided to the operator by the new display.

There exists, therefore, a need in the art for a touch screen system which will allow data entries to be made without being limited by a display refresh rate, but which can also be set to an operating mode which prevents entries from being made before the display has refreshed.

SUMMARY OF THE INVENTION

A touch screen system according to the present invention includes a monitor and a touch detector. The monitor is directed by a data processing system, such as a computer, to display appropriate images to aid data entry. The touch detector detects the presence and location of a touch on the monitor. When the images displayed are such that they do not materially change as a result of the entry of data, such as with a keypad image, a touch ahead feature is enabled, so that the touch detector sends data to a buffer where it is stored until a computer or other data processing system is able to process the data received and update the monitor. Thus, an operator is able to enter data without waiting for the display to be updated. The touch screen system provides feedback to the operator when the touch ahead feature is enabled, by an audible signal emitted when a touch is registered by the touch detector, or by a tactile feedback method such as a solenoid which strikes the monitor, causing a slight vibration detectable by the operator at registration of a touch. The system typically automatically disables the touch ahead feature when entry of data causes a change to the display, in order to prevent the operator from entering data when the visual continued entry of data prior to presentation of visual cues from a changed display would tend to result in entry of incorrect data. In order to accommodate highly skilled operators who are able to enter data without requiring prompting by visual cues, the operator is preferably provided with a manual override control so that the touch ahead feature can be enabled when desired.

A more complete understanding of the present invention, as well as further features and advantages of the invention, will be apparent from the following Detailed Description and the accompanying drawings.

DETAILED DESCRIPTION

Figure 1:
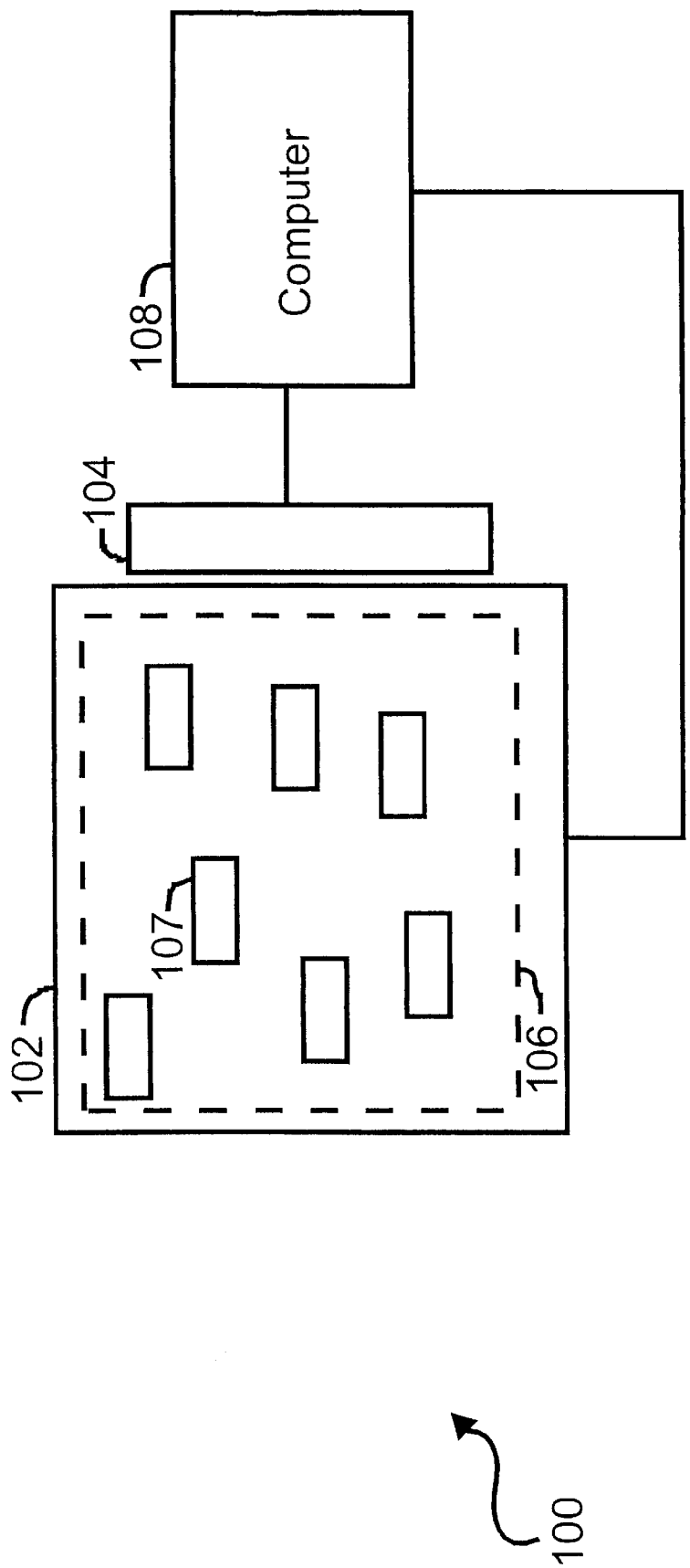
FIG. 1 illustrates a touch screen system of the prior art.

FIG. 1 illustrates a touch screen system 100 of the prior art. The system 100 includes a monitor 102 and a touch detector 104. The monitor displays a graphic image or images 106 to aid data entry. The graphic image 106 illustrated in FIG. 1 is a restaurant layout illustrating the reservation or occupancy status of tables in a restaurant. When an operator touches a portion of the graphic image 106, such as a rectangle 107 representing one table, the touch detector 104 senses and interprets the touch and sends data to a data processing system, such as a computer 108. The computer 108 then processes the data and updates the monitor display. For example, if an operator wishes to change the reservation status for the table corresponding to the rectangle 107, the operator touches that table, in other words rectangle 107, on the graphic image 106. The touch detector transmits the touch information to the computer, which transmits a subsequent image to the monitor 102, such as a list of times and names for the table, in order to allow the operator to provide specific information as to the new status of the table selected.

The touch screen system 100 is well suited for applications where a selection leads to a significant change in the image such as image 106 displayed on the monitor 102. Due to system limitations, the monitor takes a finite time to update its image, so that it cannot keep up with very rapid data entry. This is not a significant limitation in cases where one selection leads to another, but in applications where a graphic image of a keyboard or keypad is displayed the monitor 102 is not able to update as fast as information is entered into such devices. The delay in updating the monitor results in a slowing of data entry, sacrificing productivity and frustrating the operator.

Figure 2:
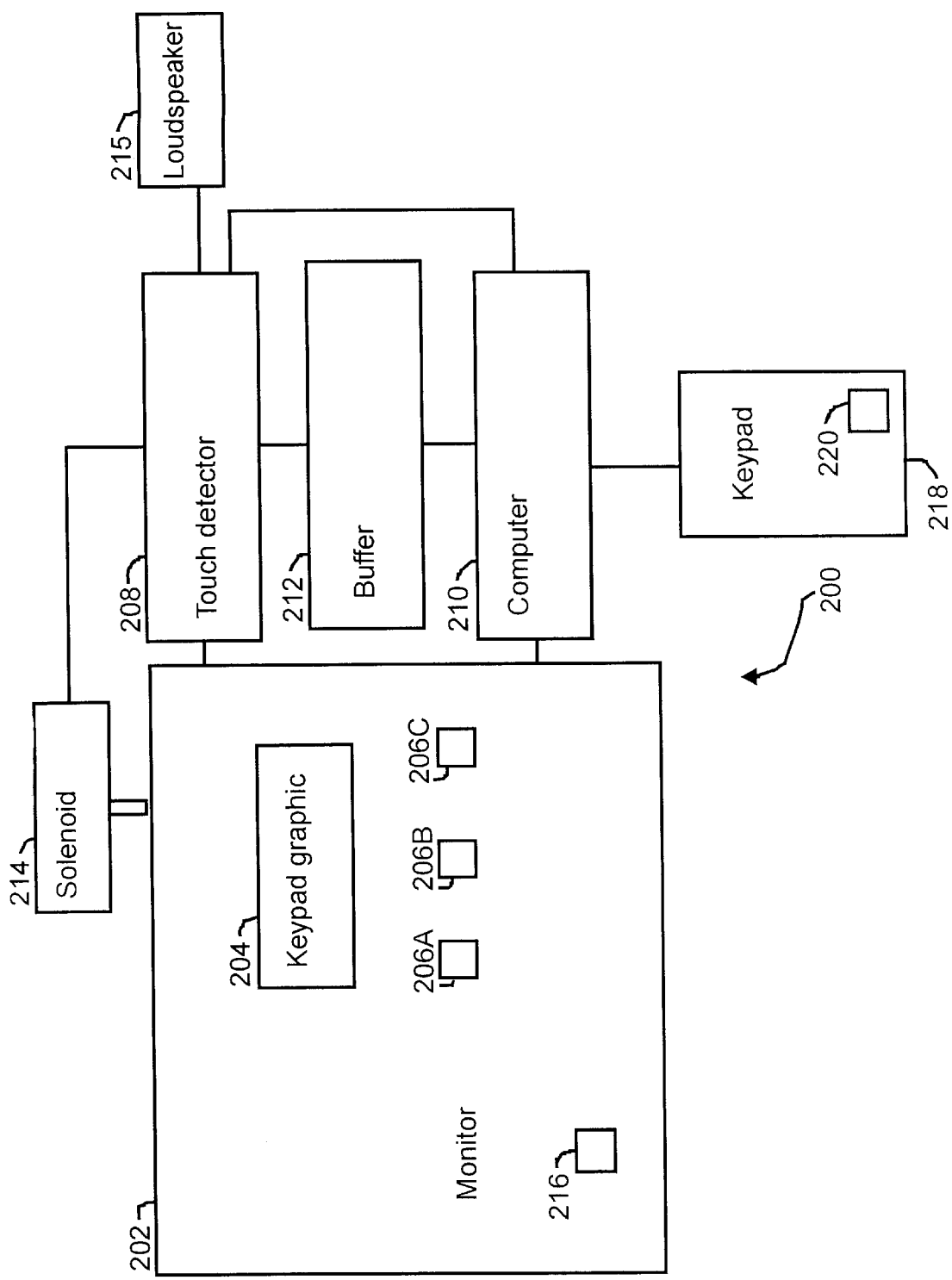
FIG. 2 illustrates a touch screen system with touch ahead capability according to the present invention.

FIG. 2 is a more detailed representation of a touch screen system 200 in accordance with the present invention. The touch screen system 200 includes a video monitor 202 which serves as a surface for a touch to be interpreted and processed as data. The monitor 202 is shown here as displaying a keypad graphic 204. The operator can touch images of the keyboard graphic 204 in order to enter data into the touch screen system 200. The monitor 202 may also display other graphics, for example button images 206A–C, in order to provide system control. The monitor 202 may display any of a number of images during the same operating session, with the images changing in accordance with the data required to be entered, and in order to display appropriate information to the operator.

Touches of the monitor 202 are detected by a touch detector 208 which senses each touch and detects the position of the touch with respect to the monitor 202. The touch detector 208 may suitably communicate with a data processing system, such as a computer 210, to receive instructions for interpretation of a touch in a particular location. For example, in the case where the monitor 202 displays the numeric keypad 204, the computer 210 may suitably direct the touch detector 208 to interpret touches within a certain range of locations as a '1', touches within another range of locations as a '2', and so on. Alternatively, the touch detector 208 may simply detect the coordinates of a location being touched and direct the coordinate information to the computer 210 for processing. The computer 210 also provides instructions to the touch detector 208 to identify areas in which touches will not be detected. These areas are typically those areas of the monitor 202 which are not part of the display graphic 204. Touches to these areas have no meaning in the context of the touch screen system, and detection of a touch to such an area would therefore introduce extraneous data.

As data is entered into the buffering system 200 by touches to the monitor 202, the system 200 will receive and process the data and update the display on the monitor 202 in accordance with the data entered.

A typical monitor of a type suitably used as the monitor 202 will not be able to update its display as fast as a skilled operator is able to enter the data. Therefore, a buffer 212 is provided to receive data from the touch detector 204 as touches are detected. Depending on system design, the buffer 212 may receive numerical or other data derived from touch locations detected by the touch detector 204, or alternatively may receive raw position data to be stored and passed along for processing by other system components. The buffer 212 preferably comprises high-speed memory in an amount suitable for storing the maximum amount of data contemplated to be received before the monitor 202 is able to receive and process the data.

The computer 210 receives data from the buffer 212, processes the data, and sends display commands to the monitor 202. The computer 210 sends updated display commands to the monitor 202 at a rate at which the monitor 202 is able to receive the commands, and extracts data from the buffer 212 whenever a new piece of data is able to be processed. At the same time, an operator is able to enter data via touches of the monitor 202 at whatever rate is desired, as data can be placed in the buffer 212 as fast as the operator can enter the data, without a need to wait for the monitor 202 to update its display.

To insure accurate data entry, the operator is preferably provided with feedback in order to determine when a touch has been detected and when a touch has not been detected. If the operator is entering data faster than the monitor 202 can be updated, feedback is not available from the monitor 202 at the time it is needed. The touch screen system 200 therefore provides feedback as each touch is detected. Feedback may suitably be provided by a solenoid 214 suitably connected to the buffer 212. As the buffer 212 receives data from a touch, the buffer 212 sends a command to the solenoid 214 to cause the solenoid 214 to tap the monitor 202, causing the monitor 202 to vibrate and notify the operator that a touch has been properly registered. Alternatively, the touch screen system 200 may provide audio feedback, for example through a loudspeaker 215. The loudspeaker 215 would sound a designated tone whenever data from a touch was received by the buffer 212.

For purposes of providing feedback, the touch detector 208 may be designed to detect a touch in an invalid area. The touch detector would not provide data to the buffer 212 in such a case, but instead would cause the loudspeaker 215 to sound a designated tone indicating an invalid touch. The touch detector 208 may communicate directly with the loudspeaker 215, or alternatively may communicate through the buffer 212 or through the computer 210.

In some applications, it is inadvisable to prevent the operator from entering information faster than the monitor 202 is able to be updated. This situation occurs, for example, when a data entry causes a change to the display such that a location on the monitor 202 represents different data than previously. This happens, for example, when the operator is accessing a series of menus, with a menu selection causing the appearance of a different menu calling for different entries. In such a case, allowing the operator to enter data before the monitor 202 is updated will allow or result in incorrect data entry, as the meaning of a touch in a particular location will have changed before the operator is provided with a display showing the new meaning of a touch. It is therefore advantageous for the buffering system 200 to enable or disable the ability to touch ahead, as appropriate. The touch detector 208 is connected to the computer 210, in addition to being connected to the buffer 212. The computer 210 is able to transmit instructions to, and receive data from, the touch detector 208. The computer 210 preferably automatically disables the touch ahead capability when the monitor 202 is changing displays in such a way that entries change. The computer 210 can simply be programmed to allow the touch ahead capability for certain displays and to disable the touch ahead capability for other displays.

A highly skilled operator who is extremely familiar with the system may wish to be able to touch ahead even in the case of changing displays. It is therefore advantageous for the touch screen system 200 to allow the operator a manual override control to force the system 200 to enable the touch ahead capability whenever desired. This can be accomplished by providing an enable/disable button graphic 216 on the monitor 202. Alternatively, it may be found advantageous to include a physical keypad 218 connected to the computer 210 as part of the touch screen system 200. In this case an enable/disable key 220 may be provided.

Figure 3:
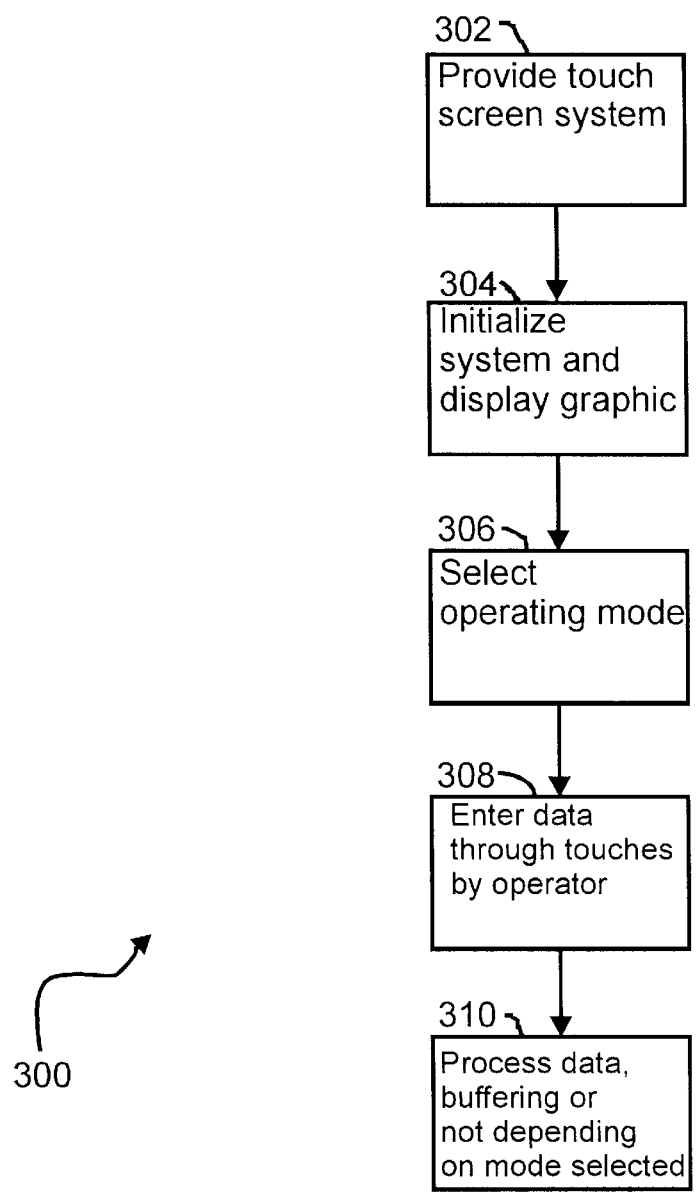
FIG. 3 illustrates a method of touch screen data entry having touch ahead capability according to the present invention.

FIG. 3 illustrates a method 300 of touch screen data entry allowing touch ahead by an operator, according to the present invention. At step 302, a touch screen system is provided, similar to the touch screen system 200 of FIG. 2. The touch screen system includes a monitor, touch detector, computer, and buffer. At step 304, the system is initialized and the monitor displays a graphic whereby an operator can make touches to enter data. At step 306, an operating mode is selected depending on the graphic displayed and selections made by the operator. If the graphic displayed is suitable for touch ahead to be allowed, or if the operator chooses a touch ahead mode, touch ahead mode is enabled. Otherwise, touch ahead mode is disabled and a standard mode is enabled.

At step 308, the operator enters data into the system by making a touch at an appropriate location on the monitor.

At step 310, the data entered by the operator is processed. If the system is in the touch ahead mode, the data is stored in a buffer and the user is provided with feedback to indicate that a touch has been registered. The data stored in the buffer is passed to the computer as it is able to be handled, and the monitor is updated with the data as it is able to refresh its display in accordance with the new data. If the system is not in the touch ahead mode, the data is passed to the computer, which disables entry of further data and updates the monitor display. The computer then re-enables the entry of data once the monitor display has been updated.

While the present invention is disclosed in the context of a presently preferred embodiment, it will be recognized that a wide variety of implementations may be employed by persons of ordinary skill in the art consistent with the above discussion and the claims which follow below.

I claim:

1. A touch ahead capable touch screen system comprising:
   a data processing system for receiving and processing data items, the data processing system being also operative to generate graphic images for providing information to an operator and facilitating data entry by the operator, the data processing system being further operative to generate updates to the graphic images depending on the data items received;
   a display for displaying the graphic images, one or more of the graphic images being adapted to direct entry of one or more of the data items by an operator, entry of each data item being accomplished by one or more touches to the graphic images;
   a touch detector for detecting an occurrence and location of each of the touches, the location of each touch being translated to reflect one of the data items, the touch detector being operative to transmit each data item to an appropriate destination; and
   a buffer adapted to receive each data item from the touch detector and transmit it to the data processing system, the buffer being able to receive each data item in a sequence of one or more data items, each data item being created by the touch detector as a result of detection by the touch detector of a sequence of touches comprising one or more touches and translation by the touch detector of the sequence of touches into the data item, the buffer being able to receive data items from the touch detector without a need to wait until the display has been updated before receiving the data items, the buffer being adapted to hold each data item until the data processing system is ready to process it, the buffer being operative to hold each data item until the display has received and processed updated graphic images delivered as a result of preceding data items resulting from detection of touches by the touch detector.

2. The system of claim 1 wherein the data processing system is programmable to receive the data items directly from the touch detector without passing the data items through the buffer or to receive the data items from the buffer, the choice being made according to predetermined criteria.

3. The system of claim 2 wherein the data processing system is set to receive the data items from the buffer when the graphic images on the display in the region where data entry occurs do not change significantly as a result of data entries, and wherein the data processing system is set to receive the data items directly from the touch detector when the graphic images on the display in the region where data entry occurs do change significantly as a result of the data entries.

4. The system of claim 3 wherein the touch detector does not accept touches until a previous data item has been received by the data processing system, if the data processing system is set to receive the data items directly from the touch detector.

5. The system of claim 4 wherein the system provides operator feedback whenever a data item is received by the buffer.

6. The system of claim 5 wherein the operator feedback includes a vibration of the display.

7. The system of claim 6 wherein the vibration of the display is produced by activation of a solenoid which strikes the display whenever a data item is received by the buffer.

8. The system of claim 7 wherein the data processing system includes an override feature to force the system to pass data items through the buffer whenever the override feature is selected by the operator.

9. A method of touch screen data entry, comprising the steps of:
   (a) providing a touch screen system;
   (b) initializing the touch screen system and displaying a graphic whereby an operator can make touches to enter data;
   (c) receiving a series of touches from the operator to enter data, each touch being translated to a data item;
   (d) transferring each data item to a buffer as translation from the corresponding touch occurs and the data item is translated, transfer of the data item to the buffer occurring as each touch occurs and a data item is produced thereby, transfer of each data item to the buffer occurring without a need to wait until updating of the display to reflect results of delivery of previous data items resulting from previous touches is completed; and
   (e) holding the data item in the buffer and transferring the data item to a data processing system, the data processing system receiving each data item and employing the data item as a data entry, the data processing system updating the display to reflect the data entry, the data processing system receiving each data item from the buffer after updating of the display.

10. The method of claim 9 wherein the step of initializing the touch screen system is followed by a step of selecting an operating mode to choose either a standard mode or a touch ahead mode and wherein steps d and e are performed if the touch ahead mode is selected, and wherein, if the standard mode is selected a step of transferring each data item to the data processing system, the data processing system disabling further touch detection, the data processing system receiving the data item and employing the data item as a data entry, the data processing system further enabling the display to reflect the data entry, the data processing system re-enabling touch detection after updating of the display is performed.

* * * * *